United States Patent
Kydles et al.

(10) Patent No.: US 9,335,754 B2
(45) Date of Patent: May 10, 2016

(54) METHOD FOR TESTING THE REAL-TIME CAPABILITY OF AN OPERATING SYSTEM

(75) Inventors: Jens Kydles, Nürnberg (DE); Markus Walter, Bamberg (DE)

(73) Assignee: Siemens Aktiengesellschaft, Munich (DE)

( * ) Notice: Subject to any disclaimer, the term of this patent is extended or adjusted under 35 U.S.C. 154(b) by 399 days.

(21) Appl. No.: 13/395,835

(22) PCT Filed: Jul. 20, 2010

(86) PCT No.: PCT/EP2010/004431
§ 371 (c)(1),
(2), (4) Date: Mar. 13, 2012

(87) PCT Pub. No.: WO2012/010182
PCT Pub. Date: Jan. 26, 2012

(65) Prior Publication Data
US 2012/0174122 A1 Jul. 5, 2012

(51) Int. Cl.
*G06F 9/44* (2006.01)
*G05B 19/042* (2006.01)
*G06F 11/07* (2006.01)

(52) U.S. Cl.
CPC .......... *G05B 19/042* (2013.01); *G06F 11/0757* (2013.01)

(58) Field of Classification Search
None
See application file for complete search history.

(56) References Cited

U.S. PATENT DOCUMENTS

| | | | | |
|---|---|---|---|---|
| 5,437,039 A * | 7/1995 | Yuen | ............................ | 718/108 |
| 6,038,632 A * | 3/2000 | Yamazaki et al. | ............ | 710/260 |
| 6,587,966 B1 * | 7/2003 | Chaiken et al. | .................. | 714/34 |
| 2002/0069233 A1* | 6/2002 | Muller et al. | ................. | 709/102 |
| 2005/0081114 A1* | 4/2005 | Ackaret et al. | ................... | 714/42 |
| 2007/0245054 A1 | 10/2007 | Wang et al. | | |
| 2007/0283066 A1 | 12/2007 | Petty | | |
| 2008/0040171 A1 | 2/2008 | Albers | | |
| 2008/0143415 A1* | 6/2008 | Poisner | ......................... | 327/292 |
| 2009/0182534 A1* | 7/2009 | Loboz | ........................... | 702/186 |

FOREIGN PATENT DOCUMENTS

| | | |
|---|---|---|
| CN | 101460929 | 6/2009 |
| DE | 101 40 675 | 3/2003 |

* cited by examiner

*Primary Examiner* — Shih-Wei Kraft
(74) *Attorney, Agent, or Firm* — Cozen O'Connor

(57) ABSTRACT

A method that tests the real-time behavior of an operating system having a first time system (e.g., a SMI tracer real-time extension) responsible for the real-time behavior of the operating system, wherein a test routine is periodically called for execution and the actual point in time of execution of the test routine is compared with an expected periodic point in time of execution of the test routine.

5 Claims, 2 Drawing Sheets

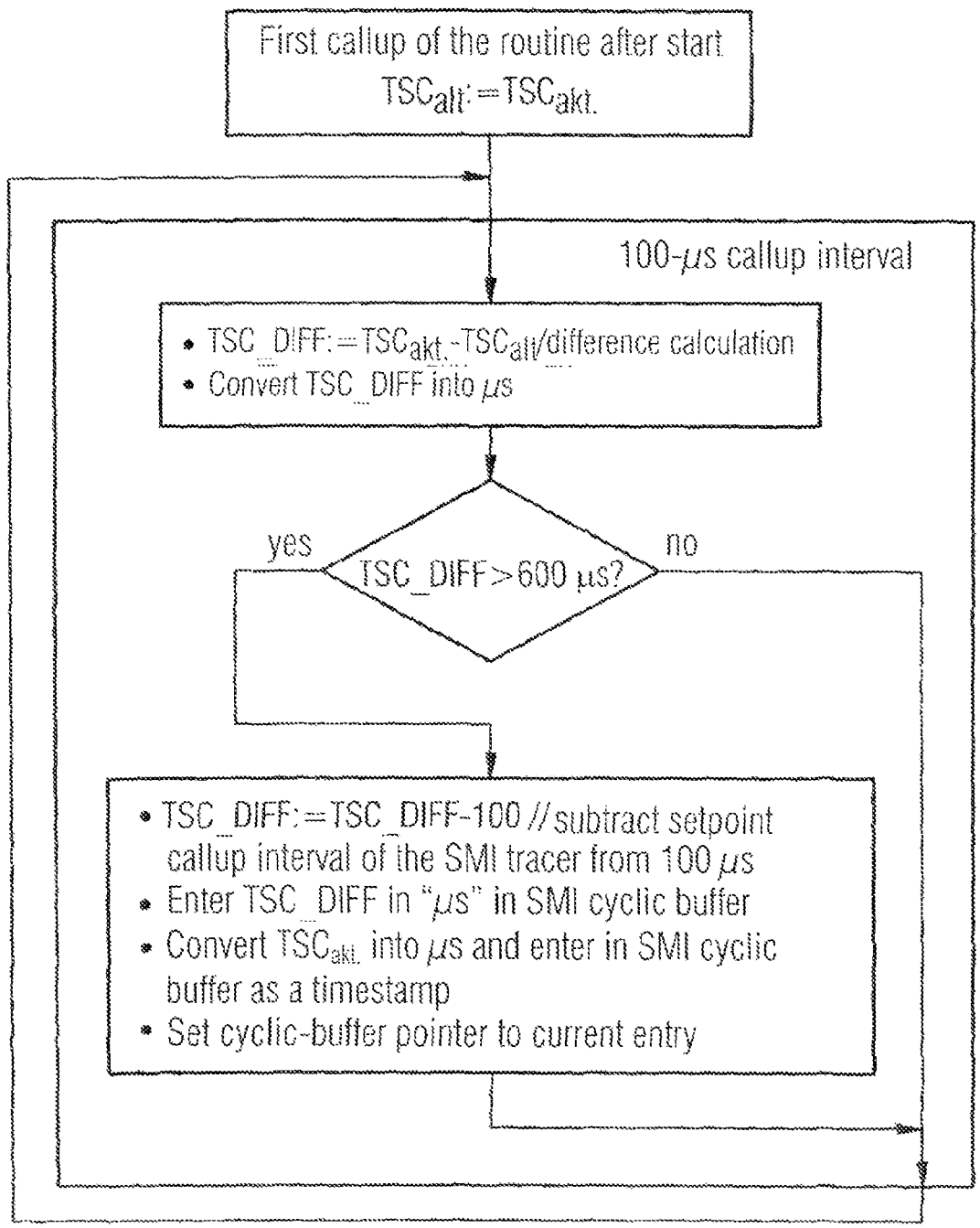

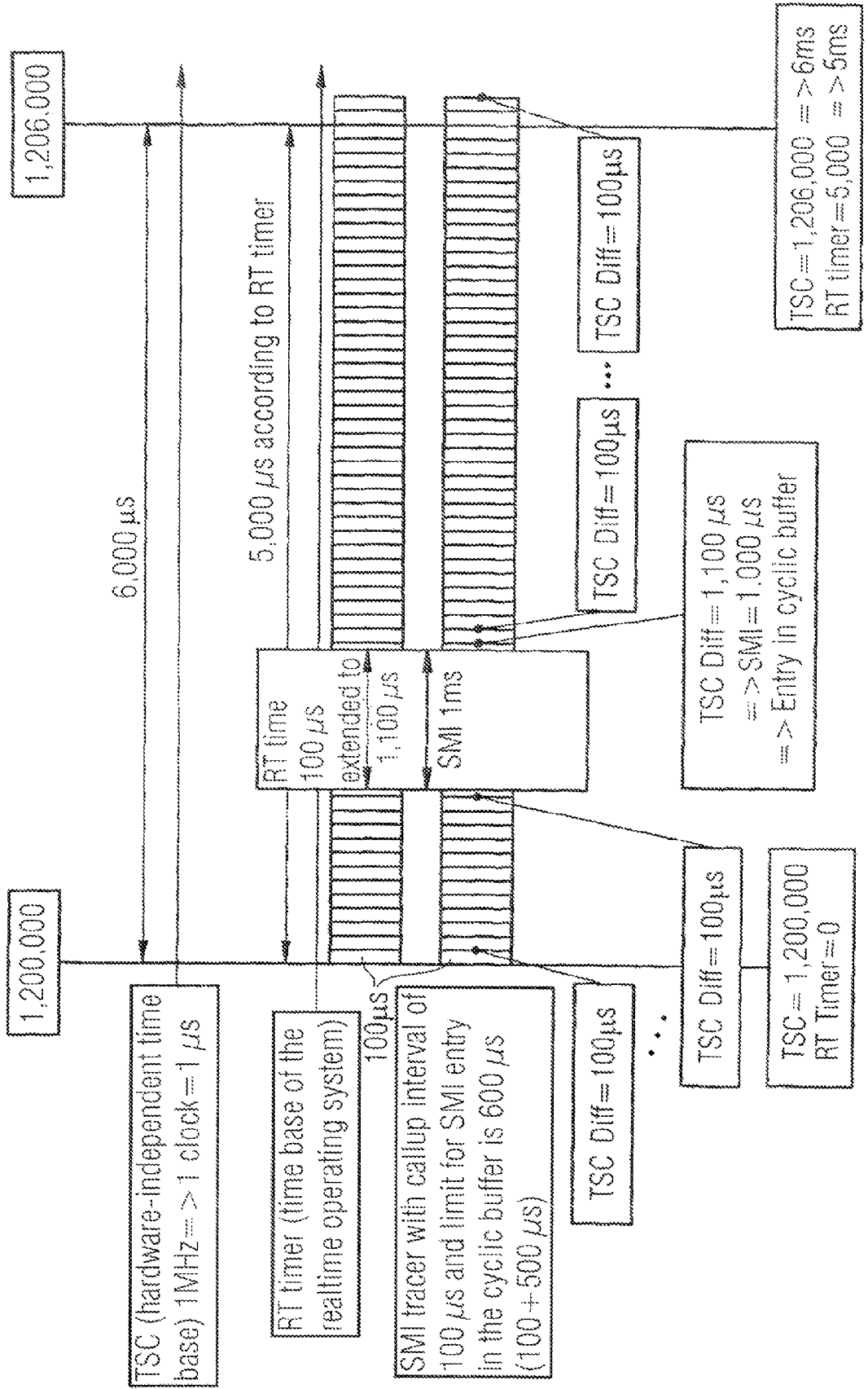

METHOD FOR TESTING THE REAL-TIME CAPABILITY OF AN OPERATING SYSTEM

CROSS REFERENCE TO RELATED APPLICATIONS

This is a U.S. national stage of application No. PCT/EP2010/004431 filed 20 Jul. 2010.

BACKGROUND OF THE INVENTION

1. Field of the invention

The invention relates to control systems and, more particularly, to stored-program controls comprising devices employed for controlling or regulating a machine or system.

2. Description of the Related Art

One of the principal requirements placed on stored-program controls is realtime (RT) capability, i.e., a system has to react to an event within a specified timeframe, i.e., within the time that processes take in the real world.

Systems of this kind that can run on modern PC systems now also exist. These, guarantee on the system side via a realtime operating system, thus an operating system having additional realtime functions for ensuring total adherence to time-related conditions and the process behavior's predictability, a realtime behavior of up to 500 µs, for instance.

Any interruptions to realtime behavior due, for instance, to higher-priority software and/or hardware interrupts (i.e., system-management interrupts) result in a "blackout" of the realtime operating system. The realtime operating system's time system will then be brought to a complete halt. The realtime operating system's time will resume after the interrupting event as though no interruption had occurred. As a result, it will not be possible for the operating system to adhere to reaction times. If this time is exceed, moreover, it will not be detected on the system side.

System-management interrupts (SMIs: Top-priority interrupts realized in the PC firmware) already pose a major problem for realtime operating systems. These kinds of interrupts are triggered on the firmware side in the case of, for example, certain temperatures in the processor (e.g., over temperature, threshold temperatures) or by PC function keys (such as screen switching and adjusting volume or brightness). SMIs can also be triggered via a USB interface. SMIs can last from a few milliseconds to, in some cases, more than 200 ms. Realtime operating systems are unable to accommodate interrupts of this type and thus lose their realtime capability. The user is unlikely to notice this until the control suffers "blackouts" and production outages occur.

Interruptions to the realtime operating system that result in one of the above-described blackouts, such as an SMI or a process (outside the realtime operating system) that uses the CPU or, as the case may be, system resources with higher priority, are at present not detected by the realtime operating system.

SUMMARY OF THE INVENTION

The object of the invention is to provide a method that solves the above-cited problems and provides the possibility to check a realtime operating system's behavior.

This and other objects and advantages are achieved in accordance with the invention by providing a method which checks the realtime behavior of an operating system, including a first time system (SMI tracer realtime extension) responsible for the operating system's realtime behavior, by periodically calling up a checking routine for execution and comparing the checking routine's actual execution instant with an expected periodic execution instant of the checking routine.

A routine is cyclically called up in the realtime operating system depending on the required realtime behavior. The callup interval corresponds at least to the required realtime behavior. The callup interval is checked via a hardware timer (for example, by using the timestamp counter (TSC) in the PC system).

If the routine's callup interval departs from the setpoint value, then that can be recorded accordingly (for example the current callup interval and a timestamp indicating when the departure occurred). Departures from the realtime behavior due, for example, to a system-management interrupt SMI, can be registered in that way and, if applicable, an appropriate reaction can ensue.

Possible reactions are (the list is not definitive):
Generating a warning message,
Stopping the control, and/or
Registering the time and duration of an SMI and
Making allowances in the system behavior.

Checking the realtime capability of systems allegedly having such capability has various advantages. Continuous checking of a system's realtime capability and, where applicable, recording the system's realtime capability, can be performed independently of the realtime operating system employed.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained below with the aid of exemplary embodiments, in which:

FIG. 1 is a flowchart of the method in accordance with an embodiment of the invention;

FIG. 2 is an exemplary diagram of a flow with system-management interrupts (SMI) in accordance with the invention.

DETAILED DESCRIPTION OF THE PREFERRED EMBODIMENTS

FIG. 1 is a flowchart of a method for a realization as an SMI tracer routine within the realtime operating system in accordance with the invention.

First the initial routine is called up. The time counter $TSC_{alt} := TSC_{akt}$ is therein reset. The routine will then be called up repeatedly with a callup interval of, for example, 100 µs. Other values are, though, possible. A difference is then calculated $TSC\_DIFF := TSC_{akt} - TSC_{alt}$.

This calculated difference will, if applicable, be converted into a different unit (µs). No further handling will occur if the difference does not exceed a previously established limit, 600 µs in the present example. The routine will be called up again on expiration of the callup interval. Various forms of handling can otherwise initially be performed, if the calculated value exceeds the limit. For instance the departure can be filed on a memory and hence logged, where it is possible for a timestamp to also be stored at the same time. The routine will thereafter likewise be re-executed.

FIG. 2 shows in each case the detection of an SMI in accordance with the method of the invention. The time bases shown are exemplary. The realtime (RT) timer forms the realtime operating system's time base. The TSC is formed directly by the processor of the realtime operating system and is independent of any possible system interrupts, SMI.

It is assumed by way of example that during the user-program callup interval SMI lasting 1 ms occurs. As a result, the realtime operating system's time base blacks out for the duration of the SMI. The real user-program callup interval is consequently prolonged to 6 ms.

This behavior can now be detected and kept under control by the "SMI tracer" monitoring routine, which is called up cyclically every 100 μs and the callup interval monitored via the independent time-stamp counter TSC. In the above example there is a TSC difference of 1100 μs (i.e., the duration of the SMI+callup interval). Based on the SMI's logged interrupt, this can be taken into account on the control side and the existence of interrupts notified to the user or other kinds of reactions initiated accordingly.

Thus, while there have shown and described and pointed out fundamental novel features of the invention as applied to a preferred embodiment thereof, it will be understood that various omissions and substitutions and changes in the form and details of the methods illustrated, and in their operation, may be made by those skilled in the art without departing from the spirit of the invention. For example, it is expressly intended that all combinations of those method steps which perform substantially the same function in substantially the same way to achieve the same results are within the scope of the invention. Moreover, it should be recognized that method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for checking a realtime behavior of an operating system having a first time system responsible for the realtime behavior of the operating system to provide a reaction to the realtime behavior of the operating system, the method comprising:

calling up a checking routine periodically for execution at a call up interval corresponding to at least a required realtime behavior of the operating system;

calculating, in a processor, a difference between an actual instant in time of execution of the checking routine and an expected periodic instant in time of the execution of the checking routine to determine whether the operating system has executed the checking routine within a predetermined time limit;

recording, in memory of the processor, differences between the actual instant in time of the execution of the checking routine and the expected periodic instant in time of the execution of the checking routine which exceed the predetermined time limit and providing the reaction of the realtime behavior of the operating system based on the recorded differences;

determining a cause of a departure from the expected periodic instant in time of the execution based on one of (i) at least one established difference and (ii) at least one recorded difference; and initiating the reaction based on one of the (i) at least one established difference and (ii) at least one recorded difference;

wherein a second, independent time system is used to perform the calculation.

2. The method as claimed in claim 1, wherein the reaction comprises issuing a warning message.

3. The method as claimed in claim 1, wherein the operating system is halted in response to an established difference.

4. The method as claimed in claim 1, further comprising:

determining a duration of trouble with the realtime behavior; and correcting the realtime behavior of the operating system.

5. The method as claimed in claim 1, wherein the checking routine comprises a system-management interrupt tracer.

\* \* \* \* \*